United States Patent [19]

Stepan et al.

[11] 3,755,675
[45] Aug. 28, 1973

[54] NONDESTRUCTIVE ANALYSIS OF FUEL PINS

[75] Inventors: Ivan E. Stepan, Idaho Falls; Norman F. Allard, Pocatello; Carl R. Suter, Idaho Falls, all of Idaho

[73] Assignee: The United States of America United States Atomic Energy Commission, Washington, D.C.

[22] Filed: Nov. 3, 1972

[21] Appl. No.: 303,552

[52] U.S. Cl..................250/391, 176/19, 250/392
[51] Int. Cl.......................... G21c 7/00, G21c 17/00
[58] Field of Search .................. 176/19, 21, 22, 28, 176/87; 250/83.3 R, 83.1 R, 84.5

[56] References Cited
UNITED STATES PATENTS

| | | | |
|---|---|---|---|
| 2,781,307 | 2/1957 | Wigner | 176/19 R |
| 2,969,307 | 1/1961 | Fermi et al. | 176/19 R |
| 2,936,274 | 5/1960 | Dessauer | 176/87 |
| 3,717,765 | 2/1973 | Hiller | 250/83.1 |
| 3,375,371 | 3/1968 | Puechl | 250/83.1 |

*Primary Examiner*—Harold A. Dixon
*Attorney*—Roland A. Anderson

[57] ABSTRACT

A method and a correspondingly adapted facility for the nondestructive analysis of the concentration of fuel and poison in a nuclear reactor fuel pin. The concentrations of fuel and poison in successive sections along the entire length of the fuel pin are determined by measuring the reactivity of a thermal reactor as each successive small section of the fuel pin is exposed to the neutron flux of the reactor core and comparing the measured reactivity with the reactivities measured for standard fuel pins having various known concentrations. Only a small section of the length of the fuel pin is exposed to the neutron flux at any one time while the remainder of the fuel pin is shielded from the neutron flux. In order to expose only a small section at any one time, a boron-10-lined dry traverse tube is passed through the test region within the core of a low-power thermal nuclear reactor which has a very high fuel sensitivity. A narrow window in the boron-10 lining is positioned at the core center line. The fuel pins are then systematically traversed through the tube past the narrow window such that successive small sections along the length of the fuel pin are exposed to the neutron flux which passes through the narrow window.

9 Claims, 2 Drawing Figures

PATENTED AUG 28 1973

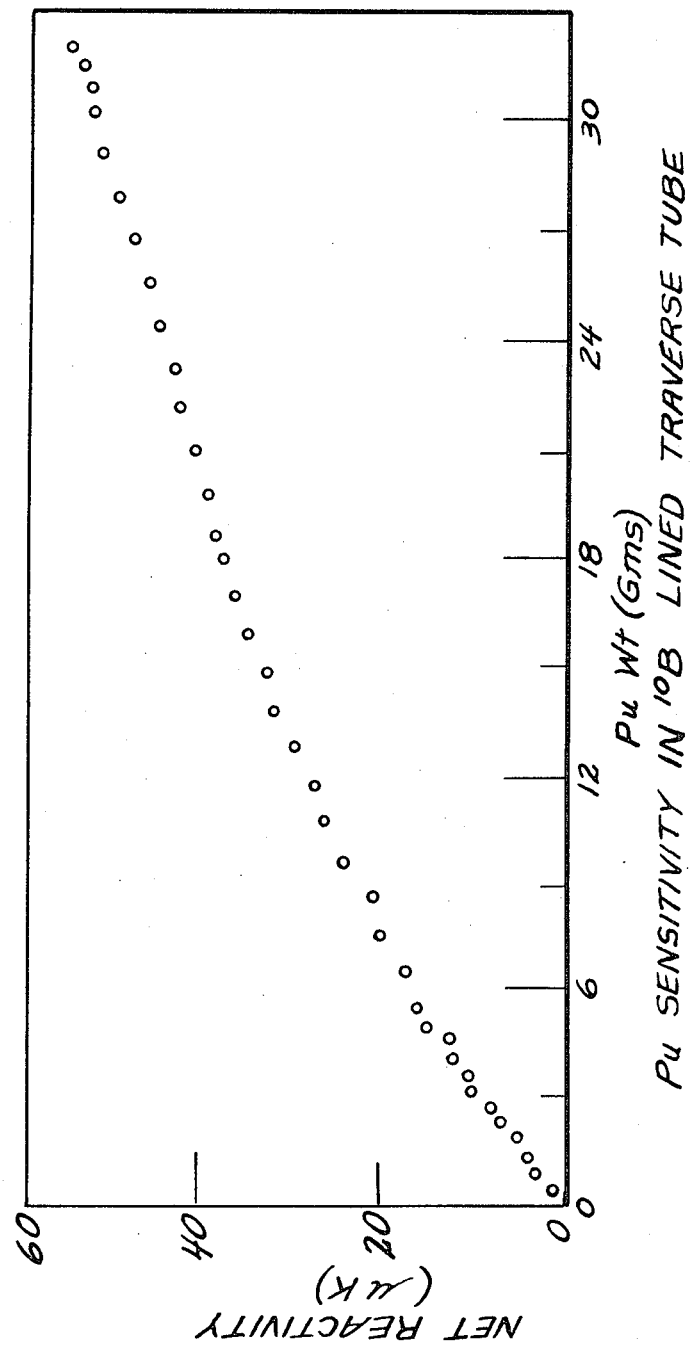

NONDESTRUCTIVE ANALYSIS OF FUEL PINS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates generally to nondestructive testing and particularly to nondestructive analysis of nuclear reactor fuel pins. More particularly, this invention is concerned with the nondestructive analysis of the homogeneity of the fuel composition of a nuclear reactor fuel pin. Specifically, the invention involves a method and a correspondingly adapted facility in which to carry out the method for analyzing the fuel and poison concentrations in successive small sections along the length of a nuclear reactor fuel pin.

Nuclear energy is becoming a very important means for the production of useful power in numerous countries throughout the world. Although operating nuclear power reactors are widely distributed among the various nations, only a few countries are able to invest the necessary funds for the construction and operation of fuel element fabrication plants and fuel recovery plants. Consequently, while many countries will have a need for fuel elements, the fabrication of these elements and the recovery of fuel from spent elements will be conducted in a limited number of countries. The commerce between nations in fuel elements for these power reactors will become increasingly important, and with such international trade, it will be necessary to control and monitor the transfer of nuclear materials and correspondingly establish strict accounting procedures for quantitative control.

Fuel elements for some types of reactors incoporate a burnable poison along with the nuclear fuel. Two such reactors which will incorporate boron as the burnable poison in the fuel are the United States Atomic Energy Commission's Advanced Test Reactor and Engineering Test Reactor, both located at the National Reactor Testing Station in Southeastern Idaho. Because of its high thermal neutron cross-section only very small quantities of boron-10 are required, such as 0.75 gram boron-10 in 1,000 grams uranium-235 in an Advanced Test Reactor fuel element. This very small amount of boron makes control of total quantity and distribution extremely important but correspondingly difficult. Specifications require uniform distribution, with no clumping of the boron-10 in order to minimize peaking in neutron flux, heat generation and burnup. While facilities are known which will permit the determination of fuel and poison in reactor fuel elements, such as described in U. S. Pat. No. 3,070,538 as an example, no previously known facilities or method have proven sufficiently accurate to determine variations or assure homogeneity in the fuel elements containing such small amounts of boron-10. In particular, for many years, Advanced Test Reactor fuel elements and Engineering Test Reactor fuel elements have been assayed for total boron-10 content by reactivity measurements in a critical facility where the regulating rod position is correlated with the boron-10 absorber by means of calibrating standards. However, although this technique has provided satisfactory determination of total boron-10 content, it cannot provide information on the distribution of the boron-10 or the homogeneity of the fuel element.

Therefore, it is an object of the present invention to provide a method and means for nondestructively determining the fuel and poison content of nuclear reactor fuel elements.

It is a further object of this invention to enable the determination of the homogeneity of a fuel element and the distribution of a very small amount of a burnable poison therein.

A prime object of the present invention is to enable the determination of the concentrations of fuel and poison in small sections along the length of a nuclear reactor fuel pin.

BRIEF DESCRIPTION OF THE DRAWINGS

Other objects and advantages of the invention will become apparent upon reading the following description and upon reference to the drawings, in which:

FIG. 2 is a graph of a calibration curve showing the reactivity of a reactor as a function of fuel concentration for various concentrations of fuel for known standards and clearly showing the sensitivity of the present invention to variations in fuel content.

SUMMARY OF THE INVENTION

Figure 1:
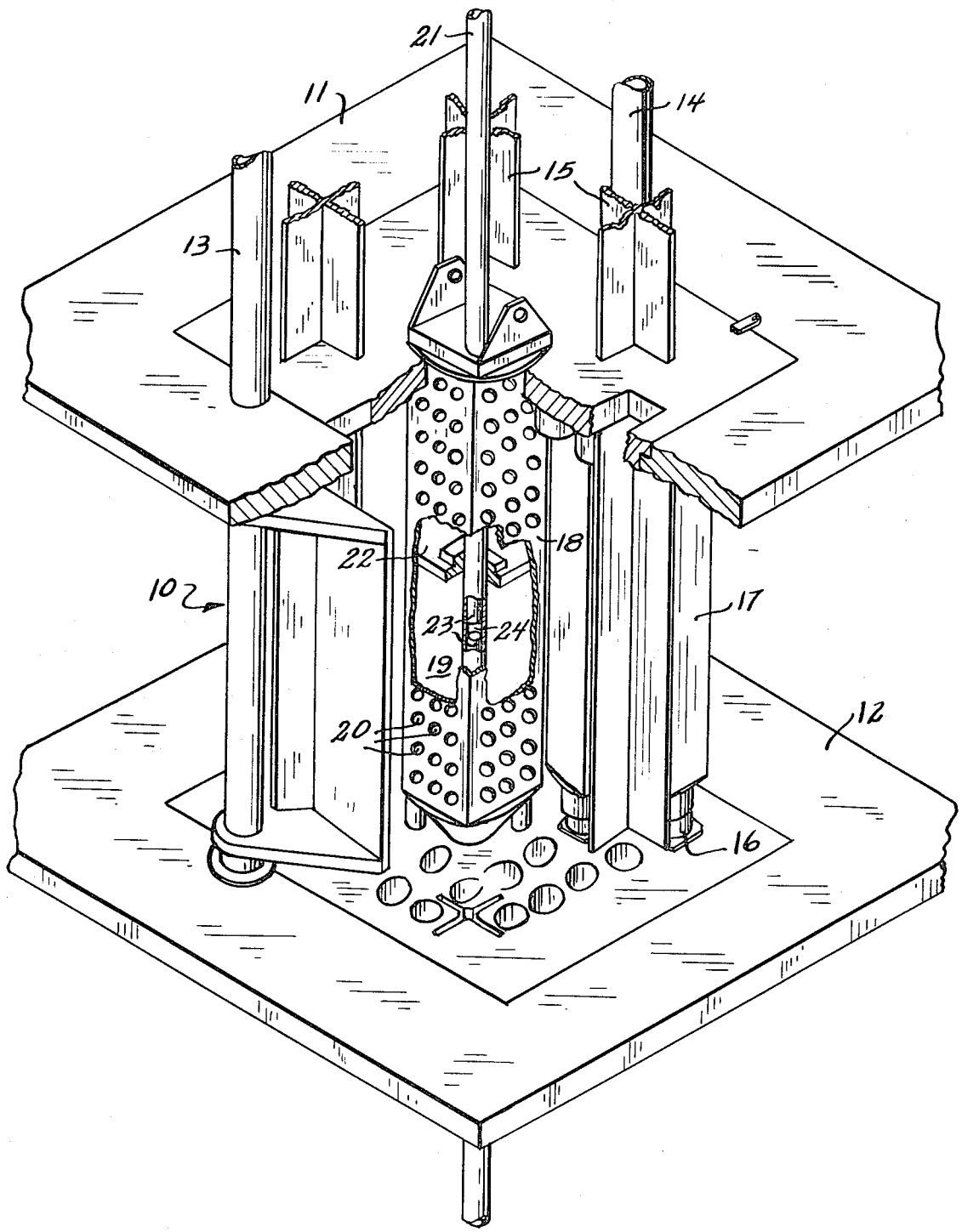
FIG. 1 is an isometric view of a facility adapted in accordance with the present invention, such view largely omitting extraneous detail and being partially broken away to show important aspects.

In accordance with the present invention, the concentration and distribution of fuel and a burnable poison in a nuclear reactor fuel pin are determined. A low-power thermal nuclear reactor having an extremely high sensitivity to changes in the fuel content within the reactor core and especially within a water-moderated test region at the center of the core is adapted to enable such determination at successive points along the length of the fuel pin. A dry traverse tube is passed through the reactor core through the test region. The traverse tube has a lining, composed of a neutron-absorbing material, which extends both above and below the reactor core. The tube is positioned such that a narrow window in the neutron-absorbing lining about the axis of the tube lies within the test region. The nuclear reactor fuel pin is traversed through the reactor core within the traverse tube in a manner such that successive small sections along the length of the fuel pin are systematically exposed to the neutron flux of the reactor through the narrow window. The neutron-absorbing lining shields the remainder of the fuel pin from the neutron flux such that only a small section of the length of the fuel pin is exposed at any one time. The resulting reactivity of the reactor is measured as each successive small section of the fuel pin is exposed, each of the measured resulting reactivities being dependent upon the composition of the sample pin at the exposed small section. The concentrations of fuel and poison are determined by inserting the fuel pin and so exposing the sections to the neutron flux at two separate locations in the reactor core, the two locations having different poison and fuel sensitivities. An inhomogeneity along the length of the fuel pin can be determined by rapidly scanning the entire length of the fuel pin while monitoring the reactivity of the reactor for any change, a change in the reactivity as the fuel pin is scanned being indicative of an inhomogeneity.

SPECIFIC EMBODIMENT OF THE INVENTION

The various features of the present invention can be best understood and appreciated by a more detailed description of a specific embodiment of the present invention. While the invention will be described in connection with one specific embodiment, it should be understood that the invention is not so limited but that the description is so directed for the sake of clarity and as an aid in understanding the inventive aspects.

In accordance with the present invention, a low-power thermal nuclear reactor having an extremely high sensitivity to changes in the fuel content within the reactor core and especially within a water-moderated test region at the center of the core is adapted to enable determination of the concentration of fuel and a burnable poison at successive points along the length of nuclear reactor fuel pins. The Advanced Reactivity Measurement Facilities, a swimming-pool-type reactor with a light-water-moderated core located at the National Reactor Testing Station in Southeastern Idaho, is such a low-power reactor and was so adapted. The general reactor structure consists of a control bridge, lattice support frame, and upper and lower grid plates. The upper and lower grids are two 46-inch-square, aluminum plates spaced by spindles at the four corners. These grids have penetrations for accommodating a 6 by 6 array of fuel assemblies, six instrument thimbles, four safety rods, a shim rod, a regulating rod and a central water hole capsule holder. Both grids have stainless steel fuel element grid adaptors which hold and position the fuel elements. The core is isolated and protected from external vibrations. The core is designed with a central water-filled volume containing no fuel which serves as a test region. A more detailed description of the Advanced Reactivity Measurement Facilities can be obtained from United States Atomic Energy Commission Research and Development Report IDO-17005, Reactor Technology, TID-4500 (34th Ed.) titled "The Advanced Reactivity Measurement Facilities" and issued October, 1964.

Turning to FIG. 1, the reactor is shown as adapted with the extraneous details of the reactor structure largely omitted. The core region of the reactor, indicated generally by 10, lies between upper grid plate 11 and lower grid plate 12. The shim rod 13 and regulating rod 14 extend from the lower grid plate 12 upward through upper grid plate 11. The four safety rods 15 are retractable from the reactor core region 10. Fuel element grid adaptors 16 located on both upper grid plate 11 and lower grid plate 12 hold and position the fuel elements 17, the grids being able to accommodate a 6 by 6 array of fuel assemblies. A central water hole capsule holder 18 lies along the vertical axis of the reactor core. Numerous perforations 20 in the capsule holder 18 permit water to enter the interior which serves as a test region 19.

In accordance with the invention, a dry traverse tube 21 is passed through the reactor core and through the test region 19. A support plate 22 in the capsule holder 18 helps to support the traverse tube 21. Tube 21 has an interior lining 23 of a neutron-absorbing material which in this particular instance is boron-10. The lining 23 has a narrow window 24 about the axis of the tube 21. The tube 21 is positioned such that window 24 lies within the test region 19. In this specific embodiment, the window 24 is a ¼-inch wide and lies at the center line of the reactor core. The neutron-absorbing lining 23 extends 12 inches above and below the reactor core region 10. Standard mechanical means are used to traverse a nuclear reactor fuel pin (not shown) through the reactor core region 10 within the traverse tube 21.

As a fuel pin is inserted into the reactor core, the fuel pin is shielded from the neutron flux of the reactor core by the boron-10 lining 23. Since the reactor core, in essence, does not yet see the shielded fuel pin, the reactivity of the reactor does not change. As the fuel pin is traversed through the core within the traverse tube 21, the fuel pin will pass by window 24. The portion of the fuel pin opposite the window 24 will be exposed to the neutron flux of the reactor core and the reactivity of the reactor will be affected by the fuel content in that small section of the length of the fuel pin which is exposed to the neutron flux through the window. Only the small section of the fuel pin opposite the window is exposed to the neutron flux at any one time as the remainder of the fuel pin is shielded by the neutron-absorbing lining. Consequently, the change in reactivity of the reactor is attributable to the particular small section of the fuel pin exposed. The fuel pin is traversed through the tube systematically such that successive different small sections of the length of the fuel pin are exposed to the neutron flux through the window and correspondingly affect the reactivity of the reactor until the entire length of the sample pin has been so exposed. The speed at which the fuel pin can be traversed through the reactor core can vary. In practice, the speed has been varied from 3 inches per minute to 9 inches per minute without having any effect on the accuracy of the measurements. The reactivity of the reactor is measured as each successive small section of the fuel pin is exposed to the neutron flux through the window. Since the measured resulting reactivity of the reactor is dependent upon the composition of the fuel pin at the exposed small section, the composition of each small section of a sample fuel pin can readily be determined from the corresponding measured reactivities.

The concentration of fuel in each successive small section along the length of a sample fuel pin can be determined from so measuring the reactivities of the reactor corresponding to each small section and comparing with a calibration obtained from a series of standard fuel pins of known concentrations. Since the reactor is a low or zero power reactor, the regulating rod can be automatically controlled to maintain the reactivity of the reactor at a constant value. The rod position can then be calibrated as a function of fuel concentration with the series of standard pins of known concentrations. The concentration of fuel in each successive small section along the length of a sample fuel pin can be determined from the regulating rod position as each small section of the sample pin is exposed. Alternatively, the net reactivity of the reactor can be measured for the series of standard fuel pins of known concentrations and a calibration curve of net reactivity as a function of concentration can be established. The net reactivity of the reactor can then be measured for each small section of the sample fuel pin and the concentration of fuel in each section determined from the calibration curve. A series of standards with known concentrations of plutonium-239 were inserted in the transverse tube opposite the window and the net reactivity measured. These values are listed in Table I. As can readily be seen from the values, differences in fuel content of less than 0.1 gram were easily detected. The accuracy obtained by measuring a pin three different times gave a standard deviation of less than 0.1 percent of total reactivity. Referring to FIG. 2, there is shown a graph of the calibration curve established with these standards showing the net reactivity of the reactor as a function of the weight of plutonium. The smooth calibration curve clearly shows the sensitivity to plutonium opposite the window in the boron-10-lined traverse tube. An inhomogeneity in the sample fuel pin can be more readily determined by rapidly scanning along the entire length and monitoring the reactivity of the reactor for any change. A change in the reactivity as the fuel pin is scanned indicates an inhomogeneity in the composition of the fuel pin.

The concenration of fuel and the concentration of a poison in successive small sections along the length of a sample fuel pin which contains a poison can also be determined. The traverse rod is positioned so as to expose each section of the sample and each of the series of standard fuel pins to the neutron flux of the reactor at each of two axially separate locations in the water region of the reactor core. The two locations are chosen so as

TABLE I

| Grams Fuel ($^{239}$Pu) | Net Reactivity ($\mu k$) |
|---|---|
| 32.7489 | 55.74 |
| 31.5802 | 54.14 |
| 30.9958 | 53.64 |
| 30.4115 | 53.04 |
| 29.2334 | 51.94 |
| 28.0552 | 50.04 |
| 26.8772 | 48.29 |
| 25.6991 | 46.74 |
| 24.5210 | 45.54 |
| 23.3428 | 43.74 |
| 22.1649 | 43.44 |
| 20.9868 | 41.54 |
| 19.8087 | 40.24 |
| 19.2150 | 39.39 |
| 18.6213 | 39.25 |
| 18.0276 | 38.26 |
| 16.9796 | 36.81 |
| 15.9316 | 35.64 |
| 14.8836 | 33.54 |
| 13.8356 | 32.69 |
| 12.7876 | 30.44 |
| 11.7396 | 28.14 |
| 10.6916 | 26.89 |
| 9.6436 | 24.69 |
| 8.5956 | 21.69 |
| 7.5476 | 20.54 |
| 6.4946 | 18.09 |
| 5.4516 | 16.84 |
| 4.9973 | 15.64 |
| 4.5430 | 12.69 |
| 4.0887 | 12.39 |
| 3.6334 | 10.84 |
| 3.1791 | 10.39 |
| 2.7248 | 8.09 |
| 2.2705 | 7.34 |
| 1.1862 | 5.34 |
| 1.3619 | 4.09 |
| .9076 | 3.29 |
| .4543 | 1.34 |
| 0.0000 | 0.00 | to have different poison and fuel sensitivities. Two equations with two unknowns can then be established and the standard pins used in these equations to obtain weighting factors for the locations and fuel and poison concentrations. The two measured reactivities, one obtained at each of the two separate locations, for each section of the sample pin can then be used to obtain the fuel and poison concentrations in each section of the sample fuel pin by employing the obtained weighting factors.

The embodiments of the invention in which an exclusive property of privilege is claimed are defined as follows:

1. A method for the nondestructive testing for an inhomogeneity in the composition of a nuclear reactor fuel pin along its length comprising:
   a. inserting the sample fuel pin to be analyzed into the core of the nuclear reactor;
   b. shielding the sample pin from the neutron flux of the rector core along all but a small section of the length of the sample pin;
   c. exposing only a small section of the length of the sample pin to the neutron flux of the reactor core at any one time while shielding the sample pin from the neutron flux along the remainder of its length;
   d. rapidly scanning the fuel pin along the entire length; and
   e. monitoring the reactivity of the reactor for any change in reactivity as the fuel pin is scanned, a change in the reactivity as the fuel pin is scanned indicating an inhomogeneity.

2. A method for the nondestructive analysis of a nuclear reactor fuel pin comprising:
   a. inserting the sample fuel pin to be analyzed into the core of a nuclear reactor;
   b. shielding the sample pin from the neutron flux of the reactor core along all but a small section of the length of the sample pin;
   c. exposing only a small section of the length of the sample pin to the neutron flux of the reactor core at any one time while shielding the sample pin from the neutron flux along the remainder of its length;
   d. systematically exposing successive different small sections of the length of the fuel pin to the neutron flux of the nuclear reactor core until the entire length of the sample pin has been so exposed; and
   e. measuring the resulting reactivity of the reactor as each successive small section of the sample pin is exposed to the neutron flux, each of the measured resulting reactivities of the reactor being dependent upon the composiion of the sample pin at the exposed small section.

3. The method in accordance with claim 2 wherein, in order that only a small section of the length of a fuel pin be exposed to the neutron flux of the reactor core at any one time while the remainder of its length is shielded from the neutron flux, a tube is lined with a neutron-absorbing specie; a narrow window about the axis of the tube is provided in the neutron-absorbing lining; said tube is placed through the reactor core; said tube is positioned such that the neutron-absorbing lining extends both above and below the reactor core and such that the narrow window in the lining lies at a point which is within the reactor core; the fuel pin is passed through the reactor core within the tube; and the entire length of the fuel pin is systematically passed by said narrow window such that successive different small sections of the length of the fuel pin are exposed to the neutron flux.

4. The method in accordance with claim 3 wherein the tube is lined with boron-10; a ¼ inch high window about the axis of the tube is provided in the lining; and the tube is positioned such that the window in the lining lies at the vertical center line of the nuclear reactor core.

5. The method in accordance with claim 4 wherein a series of standard fuel pins having various known concentrations of fuel are successively inserted into the reactor core within said tube and positioned opposite said window; the resulting reactivity of the reactor is measured for each successive standard fuel pin; and the concentration of fuel in each successive small section of the sample fuel pin is determined by comparing the corresponding measured reactivity for each successive small section of the sample pin with he reactivities measured for the standard fuel pins of known concentrations.

6. A method of nondestructively determining the concentration of fuel in each successive small section along the length of a sample nuclear reactor fuel pin comprising:
  a. inserting the sample fuel pin to be analyzed into the core of a nuclear reactor;
  b. shielding the sample pin from the neutron flux of the reactor core along all but a small section of the length of the sample pin;
  c. exposing only a small section of the length of the sample pin to the neutron flux of the reactor core at any one time while shielding the sample pin from the neutron flux along the remainder of its length;
  d. systematically exposing successive different small sections of the length of the fuel pin to the neutron flux of the nuclear reactor core until the entire length of the sample pin has been so exposed;
  e. measuring the resulting reactivity of the reactor as each successive small section of the sample pin is exposed to the neutron flux;
  f. successively inserting a series of standard fuel pins having various known concentrations of fuel into the same location in the core of the nuclear reactor;
  g. shielding the standard pin from the neutron flux of the reactor core along all but a small section of the length of the standard pin, the small section having identical dimensions as the corresponding small sections of the sample pin which were systematically exposed;
  h. exposing this small section of the length of the standard pin to the neutron flux of the reactor core while shielding the standard pin from the neutron flux along the remainder of its length;
  i. measuring the resulting reactivity of the reactor as each successive standard fuel pin of known concentration is exposed to the neutron flux; and
  j. comparing the measured reactivity of the reactor for each successive small section of the sample pin with the reactivities measured for each of the standard pins of known concentrations whereby the concentration of fuel in each successive small section along the length of the sample pin is determined from the corresponding measured reactivity.

7. A method in accordance with claim 6 for determining the concentration of fuel and the concentration of poison in successive small sections along the length of a sample fuel pin which contains a burnable poison wherein the sample fuel pin to be analyzed and each of the series of standard fuel pins of various known concentrations are all inserted in turn into the reactor core and exposed to the neutron flux at two separate locations in the reactor core, said two locations having different poison and fuel sensitivities, whereby the concentration of fuel and the concentration of poison in each successive small section along the length of the sample fuel pin are determined from the two corresponding measured reactivities and the measured reactivities for the standard pins.

8. A facility for the nondestructive analysis of the fuel composition in successive small sections along the length of a nuclear reactor fuel pin comprising: a low-power thermal nuclear reactor, said reactor having an extremely high sensitivity to changes in the fuel content within the reactor core; a test region at the center of said reactor core and extending along the vertical axis thereof; said test region containing water; a dry traverse tube extending through the center of said reactor core and through said test region; a lining of a neutron-absorbing material within said dry tube; said lining extending both above and below said reactor core; a narrow window in said lining, said window being about the axis of said tube; said tube being positioned such that said narrow window lies within said test region; and means for traversing a nuclear reactor fuel pin through said reactor core within said traverse tube in a manner such that successive small sections along the length of the fuel pin are systematically exposed to the neutron flux of the reactor through said narrow window.

9. The facility in accordance with claim 8 wherein said neutron-absorbing lining is boron-10 said lining extends at least 12 inches above and below said reactor core, said window is one-quarter inch wide; and said window is positioned at the center line of the reactor core.

* * * * *